United States Patent
Maniwa

[19]
[11] Patent Number: 5,933,584
[45] Date of Patent: Aug. 3, 1999

[54] NETWORK SYSTEM FOR UNIFIED BUSINESS

[75] Inventor: Yoshio Maniwa, Yokohama, Japan

[73] Assignee: Ricoh Company, Ltd., Tokyo, Japan

[21] Appl. No.: 08/855,665

[22] Filed: May 14, 1997

Related U.S. Application Data

[62] Division of application No. 08/208,882, Mar. 11, 1994, abandoned.

[30] Foreign Application Priority Data

Mar. 13, 1993 [JP] Japan .................................. 5-078790

[51] Int. Cl.⁶ .................................................. G06F 15/00
[52] U.S. Cl. ............................................................ 395/114
[58] Field of Search ................................... 395/101, 105, 395/106, 109, 110, 111, 112, 113, 114, 117, 672, 673, 674, 188.01, 527, 200.3, 200.31; 399/16, 18, 46, 361, 364, 369, 403, 404, 405, 407; 347/104, 106; 101/2, 18, 33, 34

[56] References Cited

U.S. PATENT DOCUMENTS

| | | | |
|---|---|---|---|
| 3,789,365 | 1/1974 | Jen et al. .............................. | 340/172.5 |
| 3,825,902 | 7/1974 | Brown et al. ......................... | 340/172.5 |
| 4,764,869 | 8/1988 | Miyazaki et al. ...................... | 364/300 |
| 4,858,171 | 8/1989 | Furusawa et al. ..................... | 364/900 |
| 4,967,342 | 10/1990 | Lent et al. ............................ | 364/200 |
| 5,018,079 | 5/1991 | Shukunami et al. ................... | 364/519 |
| 5,050,098 | 9/1991 | Brown, III et al. ................... | 364/519 |
| 5,056,768 | 10/1991 | Koyama ................................ | 271/319 |
| 5,058,037 | 10/1991 | Kageyama et al. .................... | 364/519 |
| 5,136,343 | 8/1992 | Braswell .............................. | 399/403 |
| 5,148,286 | 9/1992 | Knodt et al. .......................... | 358/296 |
| 5,165,014 | 11/1992 | Vassar ................................. | 395/112 |
| 5,206,735 | 4/1993 | Gauronski et al. .................... | 358/296 |
| 5,220,674 | 6/1993 | Morgan et al. ........................ | 395/800 |
| 5,243,691 | 9/1993 | Kuwabara et al. .................... | 395/112 |
| 5,245,368 | 9/1993 | Farrell et al. ......................... | 358/401 |
| 5,262,851 | 11/1993 | Nakatani et al. ...................... | 358/437 |
| 5,274,834 | 12/1993 | Kardach et al. ....................... | 395/800 |
| 5,287,194 | 2/1994 | Lobiondo .............................. | 358/296 |
| 5,299,296 | 3/1994 | Padalino et al. ....................... | 395/112 |
| 5,303,336 | 4/1994 | Kageyama et al. .................... | 395/114 |
| 5,325,527 | 6/1994 | Cwikowski et al. ................... | 395/650 |
| 5,333,246 | 7/1994 | Nagasaka ............................. | 395/133 |
| 5,383,129 | 1/1995 | Farrell ................................ | 364/464.01 |
| 5,450,571 | 9/1995 | Rosekrans et al. .................... | 395/112 |
| 5,467,434 | 11/1995 | Hower, Jr. ............................ | 395/114 |
| 5,475,801 | 12/1995 | Brindle et al. ........................ | 395/114 |

FOREIGN PATENT DOCUMENTS

| | | |
|---|---|---|
| 0263799A2 | 4/1988 | European Pat. Off. . |
| 0529808A2 | 3/1993 | European Pat. Off. . |

*Primary Examiner*—Scott Rogers
*Assistant Examiner*—Gabriel I. Garcia
*Attorney, Agent, or Firm*—McDermott, Will & Emery

[57] ABSTRACT

The network system according to the present invention incorporates functions for realization of a printing system as the print server software in the print server machine (workstation), and each user communicates with the print server software (PS) through a menu software available from the workstations for a self machine or a menu software available from a particular workstation and executes data output through the printer.

32 Claims, 5 Drawing Sheets

NETWORK SYSTEM FOR UNIFIED BUSINESS

This application is a division of application Ser. No. 08/208,882 filed Mar. 11, 1994.

FIELD OF THE INVENTION

The present invention relates to a network system in which a plurality of workstations are connected through a network to each other, and more particularly to a network system for unified business used to build such systems as a printing system, a facsimile system, and an electronic circulation system making use of workstations already installed.

BACKGROUND OF THE INVENTION

It seems that, in association with development and diffusion of network environment, a network system in which a plurality of workstations are connected to each other through a network will become more advanced and more sophisticated.

Resources shared by workstations connected to each other in a network system are called server, and generally such servers as a file server providing dedicated services for construction of more efficient systems by sharing a large scale file, a communication server in which communicating functions for communications with other network systems (or computer systems) through a wide area network are concentrated, and furthermore a print server providing dedicated controls over output devices for use of output devices such as printers are known.

On the other hand, as I/O devices, such devices as, for instance, a printer providing a luster image as output to record paper, a scanner reading a manuscript as a luster image, a modem executing data transactions with external systems making use of a telephone network, and a console which is a man machine interfacing means between users and a machine (a workstation) are known.

Types of data transferred between these I/O devices are classified to image data, character data, and graphic data. However, there are various restrictions concerning the way to express each type of data, and practically there are many types of data. Also there are may types of I/O device because of difference in such factors as resolution and tone.

For the reasons as described above, in I/O devices connected to the conventional type of network system (or in I/O devices which may be connected to the conventional type of network in the future), a convertor to convert data is installed so that any type of data can be processed in the network system.

However, there have been the problems (1) to (5) as described hereinafter in the conventional type of network system.

(1) When a print server is used, although a printer connected to a network can be shared by each workstation, the system generally assumes use of a printer by a plurality of users, so that the printer can not be used so conveniently and freely as a printer dedicated for use in each individual workstation. Concretely, as operating environment for each individual user can not be maintained, printer setting changes each time any other user uses the printer. Also output from a number of users is provided to the same printer, management of record paper (output paper) becomes complicated and it is hard to insure security of output data.

(2) Also in a case where a system having a new functions such as, for instance, a printing system enabling data output to a shared printer from a plurality of workstations is added to a network system already installed, sometimes it is required to make an additional investment to introduce new network environment or facilities, or to change I/O devices already installed to new ones, so that it is very difficult to carry out system expansion or addition of new functions.

(3) As data type for I/O devices is converted to one corresponding to a network system so that the data can be transacted in the network system by incorporating a convertor in each I/O device, when a network system is introduced anew, if a convertor already installed in an I/O device can not correspond to the need for data conversion (or if the converted can not be integrated with the network system), then a new convertor must be added, or the converted already installed must be modified, or even a new I/O device must be purchased to satisfy the needs for the network system to be introduced anew.

(4) Development of I/O devices is made on the condition that, when an I/O device is connected to a network system, requirements for data type in the network are satisfied by incorporating a convertor in the I/O device, so that, as functions of the I/O device become more sophisticated, a vast amount of cost and time is required for designing and evaluating the convertor.

(5) Also in an optimized network system, as system development and development (or selection) of I/O devices required for the network system are carried out simultaneously, it is difficult to expand the system by adding I/O devices each based on different specifications. This problem in turn causes a great loss in the side of users in recent business environment where advanced and high value-added products have been developed and put into the market one after another.

SUMMARY OF THE INVENTION

It is a first object of the present invention to make it possible to expand step by step a network system already installed by adding a printing system, a facsimile system, a copying system, and an electronic circulation system.

Also it is a second object of the present invention to make it possible for a plurality of users to share a printer connected to a network system as well as to provide convenience and the capability to insure security as those in a printer dedicated for use in each individual workstation.

Also it is a third object of the present invention to make it easier to expand or add a network system.

Also it is a fourth object of the present invention to make it possible to connect an I/O device already installed to a network easily without changing the I/O device.

Also it is a fifth object of the present invention to reduce time and cost required for development of I/O devices and convertors connected to a network system.

Also it is a sixth object of the present invention to make it possible to connect an advanced and high value-added I/O device newly developed and put into the market easily to a network system.

To achieve the objects described above, the present invention provides a network system for unified business, in which a plurality of workstations are connected to each other through a network, comprising a printer with a controller incorporated therein which enables interactive communications and can treat all of graphics, text (characters), and images (pictures); a print server machine which is a workstation with a function to store and maintain a driver software to support interactive communications by the printer as well as printing conditions for each user as a job style file, a function to report, when any error occurs in a printer, the error to a user requesting a printing job, a function to store print data requested from each workstation as a time-seriesed queue therein and send the data to a printer, a function to send out the print data to a printer, and a function to send, before sending the print data to the printer, a job style file being stored with the user name for the print data installed therein as a server software; a plurality of workstations each with a menu software having a function to select and call a job style file for users specific to a self machine from job style files for individual users residing in the print server file, change the contents and again store the file in the print server software; and a specific workstation with a menu software for managers with a function to preferentially change or cancel an order of print data in the queue incorporated therein.

Also to achieve the objects described above, the present invention provides a network system for unified business, in which a plurality of workstations are connected to each other through a network, comprising a printer with a controller incorporated therein which enables interactive communications and can treat all of graphics, text (characters), and images (pictures); a print server machine which is a workstation with a function to store and maintain a driver software to support interactive communications by the printer as well as printing conditions for each user as a job style file, a function to report, when any error occurs in a printer, the error to a user requesting a printing job, a function to store print data requested from each workstation as a time-seriesed queue therein and send the data to a printer, a function to send out the print data to a printer, and a function to send, before sending the print data to the printer, a job style file being stored with the user name for the print data installed therein as a server software; a facsimile server machine which is a workstation with a driver function to communicate with a modem installed in the printer server machine, a function to temporally store therein received facsimile data, a function to report whether facsimile data to be received is present or not to each workstation, a function to make a question as to whether each workstation can display image data or not as well as to the resolution if possible and store the result, a function to transfer received images via the printer server machine to a printer, and a filter function to convert received images to those based on a printer language installed in the printer all installed as a facsimile server software; a plurality of workstations each with a menu software having a function to select and call a job style file for a self machine from job style files for individual users residing in the print server software, change the contents and again store the file in the print server file and a facsimile menu software having a function to check whether any facsimile data to be processes is present or not, a function to display, when possible, a received image, and a function to specify print out of the received image incorporated therein; and a specific network station with a menu software for managers having a function to preferentially change or cancel an order of print data in a queue, and a menu software for facsimile and managers having the same functions as those in the facsimile menu software and a function to preferentially delete the received image.

Also to achieve the objects as described above, the present invention provides a network system for unified business, in which a plurality of workstations are connected to each other through a network, comprising a plurality of workstations each having an image server which is a work station with a function for format management and file registration such as changing a file name, sorting or deleting a file, a function to inform a user to whom a circulation file being stored therein is to be circulated of the fact that there is information to be read by the user, a function to supply a result of checking as to whether circulated information was read by each user as input to all users to whom the information is to be circulated, a function to transfer, when specified, the circulated file to a printer or a specified print server machine, and a function to execute format management and file registration management in an interactive mode with a console and set up users to whom information is to be circulated all installed as an image server software and an image file menu software having a function to receive a report from the image server machine telling that there is information to be read, a function to display registered image files, a function to report after reading information that reading is finished, and a function to request print out of the circulation file.

Also to achieve the objects as described above, the present invention provides a network system for unified business, in which a plurality of workstations are connected to each other through a network, comprising a printer with a controller incorporated therein which has an interface for interactive communications and can totally treat graphics, text (characters) and images; a server machine which is a workstation incorporating therein a driver software to support interactive communications in the printer, a print server software having a function to store and maintain printing conditions for individual users as job style files, a function to report, when any error occurs in the printer, the error to a user requesting a print job, a function to store print data requested from each workstation as a time-seriesed queue and send the data to the printer, a function to send print data to the printer, and a function to transfer, before sending the print data to the printer, a job style file being stored with a user name for the print data, a facsimile server software having a function to temporally store a driver software for communications with a modem installed in the print server machine as well as received facsimile data, a function to report each workstation whether facsimile data to be received is present or not, a function to make an inquiry as to whether each workstation can display image data or not as well as the resolution, if possible, and store the result, a function to transfer received images through the print server machine to the printer, and a function to convert received images to those based on the printer language installed in the printer; and an image server software having a function for format management and file registration such as changing a file name, sorting or deleting a file, a function to inform users to whom a circulation file being stored is to be circulated of the fact that there is information to be read, a function to input a result of checking as to whether each user read the information into a list of all users to which the circulation file is to be circulated, and a function to transfer, when specified, the circulation file to the printer or a specified print server machine, and also having a multi-task operating system; a plurality of workstations each incorporating therein a menu software having a function to select and call a job style file for users of a self machine from job style files for individual users residing in the print server software, change the contents and again- store the file in the print server software, a facsimile menu software having a function to check whether any facsimile data to be processed has been received or not, a function to display, when it is possible to display received images, the received images, and a function to specify print out of the received images, and an image file menu software having a function to receive a report from the imager server machine telling that there is information to be read, a function to display image files being registered therein, a function to report, after reading the information that reading the information is finished, and a function to request print out of the circulation file; and a specific workstation incorporating therein a menu software for managers having a function to preferentially change or delete an order of print data in a queue, a menu software having the same functions as those in the facsimile menu software as well as a function to preferentially delete received images, and a menu software for image file manages having a function to execute format management, file registration management, and specification of users to whom a circulation file is to be circulated in an interactive mode with a console.

It is desirable that the menu software, facsimile menu software, and image file menu software each described above are unified into a software for users (CM: Client Manager) and also the menu software for managers, menu software for facsimile managers, and menu software for image file managers each described above should preferably be unified into a software for managers (AM:Administrater Manager).

Also to achieve the objects as described above, the present invention provides a network system for unified business, in which a plurality of workstations are connected to each other through a network, comprising a printer with a controller incorporated therein which has an interface for interactive communications and can totally treat graphics, text (characters) and images; a plurality of workstation each having a function to store and maintain a driver software for supporting interactive communications of the printer as well as printing conditions for each user as job style files, a function to report, when an error occurs in the printer, the error to a user requesting a printing job, a function to store print data requested from each workstation as a time-seriesed queue and send the data to the printer, a function to send the print data to the printer, a function to send job files being stored with user names before sending the print data to the printer all installed as a print server software, and also with a network interface case (NIC) directly connected to the network and a menu software having a function to select and call a job style file for a self machine from job style files for individual users residing in the print server software, change the contents and again store the file in the print server software; and a specific workstation with a menu software for managers installed therein with a function to preferentially change or cancel an order of print data in the queue.

It is desirable that, with the configuration as described above, the print server has a function to accumulate a size of paper used by each user as well as a number of used sheets and store it as an account file and also the menu software for managers should preferably have a function to read an account file in the print server file and prepare an account list for each user and a function to clear data in an account file for each user.

Also it is desirable that the print server software has a function to store soft fonts for down loading, a function to load stored fonts one by one to the printer, and a function to stop loading, when a required font has been stored in the printer, the corresponding font, the menu software for managers should preferably have a function to register a new software font as a font software in the print server software, and the menu software has a function to read a software font owned by the print server software and register a font used by a self machine as a group in the job style file.

Also it is desirable that the printer has a multi-stage output tray as a mail box, the print server software should preferably have a function to specify, before outputting the print data, a bin of the multi-stage output tray allocated to each user and discharge paper to the bin, and a function to output mail for a user with no allocated bin to a specified pool tray, the menu software for managers should preferably have a function for a manager to decide which output bin should be allocated to each user, and the menu software should preferably have a function to check an output bin allocated to a self machine.

Also it is desirable that the printer has a function a function to check whether paper is on the multi-stage tray as a mail box and in each bin, a function to output a specified number of sheets of paper for each bin page by page to the mail box, the print server software should preferably have a function to confirm that there is no paper in all bins in the mail box, chain bins confirmed as no paper therein and make the bins as targets for sorting and inform each user of the bins, a function to allow sorting, when sorting is requested from the menu software, to the user and make the print job exclusively available to the user, and a function to automatically cancel, when the print job is complete, the sorting function, and the menu software should preferably have a function to exclusively use the mail box when sorting is enabled, specify a number of copies and execute printing out.

Also it is desirable that the print server software has a function to set, when a number of bins in the mail box is smaller than a number of sheets of paper to be printed in sorting, a pool tray (a paper discharge tray other than bins in the mail box) and output pages exceeding a number of bins to the pool tray.

Also it is desirable that the pool tray has a function to output paper displacing each sheet alternately to the right and left and also a function to output paper displacing one page from another page when discharging paper exceeding a number of bins in the mail box.

Also it is desirable that the print server software has a function to store micro files for print data stream including form overlay or drawings, characters, and image data, a function to load the micro files one by one to the printer, and a function to cancel loading when a micro file already loaded in present in the printer, the menu software for managers has a function to register a new micro file as a micro file in the print server software, and the menu software has a function to read out micro files owned by the print server software as a menu and register a micro file to be used by a self machine in the job style file.

Also it is desirable that the print has a filter function to convert print data sent from a workstation to that based on the printer language installed in the printer.

Also it is desirable that the print server software has a function to accumulatively compute information as to what degree printing has been executed under what printing conditions for each printer and the information as to how many sheets of paper have been printed in one print job, and a function to store the accumulated value of printer errors and the menu software for managers has a function to execute tabular computing for an accumulated number of each printing condition, an accumulated value for each page/print job, and an accumulated value for each printer error, and a function to manage a date for accumulating each value and clear the accumulated values using the function for tabular computing.

Also it is desirable that the printer is connected to the print server machine and has a function to convert print data received from the print server software to image data and then print the data on paper and a function to convert print data received from the print server software to image data and then transfer back the data to the print server software without printing the data on paper, the printer server software has a function to transfer the image data transferred from the printer to the facsimile server software, and the facsimile server software has a function to make a determination as to whether received data is image data, character data, transfer, when the received data is character data or graphic data, the received data to the print server software, receive corresponding image data from the print server software after the data is converted to image data by the print server software, and transfer the image data to each workstation.

Also it is desirable that the facsimile server software has a function to detect ID of received data, a function to maintain a table for comparison between IDs and names of users of individual workstations, a function to send the received message, when correspondence between the received ID and a workstation, only to the workstation, and a function to send the received message, when any ID was not detected, to all workstations, and the facsimile menu software has a function to delete, when any received message is received, the received data with ID successfully detected by the facsimile server software, and a function to disable deletion of received data with ID not detected by the facsimile server software. Also it is desirable that the facsimile server machine has a console and a scanner each connected thereto and the facsimile server software includes a driver software for the console as well as for the scanner and has a function to enable setting of conditions for transmission through a facsimile machine using the console, a filter function to convert image data read by the scanner to those satisfying a resolution required for facsimile transmission, a function to compress the image data after conversion according to the required resolution, and a function to send the data via a modem through the facsimile machine.

Also it is desirable that the facsimile software has a function to set conditions for operations other than facsimile transmission and a function to transfer image data owned by each individual user together with conditions already set up to the facsimile server software and the facsimile server software has a function to compress image data transferred thereto from a workstation after converting the data according to a resolution required for transmission and then transmit the data through a facsimile.

Also it is desirable that the facsimile menu software has a function to enable setting of conditions for facsimile transmission and a function to transfer image data together with conditions already set up to the facsimile server software and the facsimile server software has a function to make a determination as to whether a receiving facsimile machine can process character data or graphic data transferred from a workstation as it is according to the facsimile transmission sequence or not, a function to transfer, when the receiving facsimile machine can process the data as it is, the character data or graphic data as it is to the receiving facsimile machine, and a function to transfer the character data or graphic data, when the receiving facsimile machine can not process the data as it is, to the print server software, ask the data to be transferred back to the facsimile server software after the data is converted to image data by the print server software, convert the image data to those based on a required resolution, then compress the data, and execute facsimile transmission of the compressed data.

Also it is desirable that the facsimile server software has a function to enable setting of conditions for copying using a console, a function to convert image data read by a scanner to those based on a resolution required for the printer or on a printer language installed in the printer, a function to transfer image data to the print server software, a filter function to rotate read image data before sending the image data to the print server software, and a function to automatically rotate an image when the paper feed direction in the printer is different from that of reading by the scanner.

Also it is desirable that the image server machine has a scanner and a larger storage capacity memory device each connected thereto, the image server software includes a driver software for the scanner as well as for the large storage capacity memory device and has a function to store image data read from the scanner as image data in the large storage capacity memory device, a function to make an inquiry as to whether each individual workstation can display image data and the resolution of display if possible and maintain the data, and a filter function to convert image data to those based on a resolution required for display or printing in and by each workstation or the printer.

Also it is desirable that a local scanner is connected to each workstation or the facsimile server machine, the image server software has a function to store image data read from the local scanner as image data in the large storage capacity memory device.

Also it is desirable that the image server software has a function to receive and store character data or graphic data to be circulated each transferred and supplied as input from a console, an auxiliary memory device (a floppy disk or a compact disk) or a workstation, a function to make an inquiry as to whether each workstation can display image data or not and types of possible display or print language and store the result of the inquiry, and a filter function to convert image data to those which can be displayed or printed by each workstation or the printer.

Also it is desirable that the image server software has a function to transfer a circulation file, when each workstation does not have a function to display the image data nor has a language for printing, from the image server software to the print server software and transfer the data converted to those displayable and sent back thereto to the workstation.

Also it is desirable that the imager server software has a function to convert editorial data in a circulation file supplied as input to an auxiliary memory device (a floppy disk or a compact disk), when the data can not be processed by the printer server software or each workstation, to those which can be processed by the print server software or each workstation, and a function to specify format of a list file in which types of editorial data processable by each workstation and the printer are registered as well that of editorial data inputted thereto and activate the filter function.

Also it is desirable that the imager sever software has a filter function to convert image data to be transferred to each workstation to character data or graphic data, and a function to transfer the image data converted to character data or graphic data to each workstation.

The network system for unified business according to the present invention incorporates a function to realize a printing system as a print server software in the print server machine (workstation), executes communications via a menu software available for managers from a specific workstation with the print server software and provides data output via the printer.

Also the network system for unified business according to the present invention incorporates a function to realize a facsimile system as a facsimile server software in a facsimile server machine (workstation), executes communications via a facsimile menu software available to each user from a workstation in the user's self system or a facsimile menu software for managers available from a specific workstation with the facsimile server software, and outputs data received from the printer. Also the network system executes facsimile transmission for data supplied as input from an input device such as a console or a scanner via a modem.

Also the network system for unified business according to the present invention incorporates a function to realize an electronic circulation system as an imager server software in an image server machine (workstation), executes communications via an image menu software available to each user from the self workstation and an image menu software available to managers from a specific workstation with the imager server software, and executes electronic circulation of a circulation file.

Also the network system for unified business according to the present invention incorporates a network interface card (NIC) directly connected to the network in a print server software, and the NIC is connected to the printer, so that a workstation working as a print server machine is not necessary.

Other objects and features of this invention will become understood from the following description with reference to the accompanying drawings.

DESCRIPTION OF THE PREFERRED EMBODIMENTS

Detailed description is made hereinafter for an embodiment of a network system for unified business according to the present invention in the order of ① the network environment, ② general connections in the network system, ③ the printing system, ④ the facsimile system, and ⑤ the electronic circulation system with reference to the related drawings.

① Network environment

At first, before description of the present embodiment itself, description is made for the network environment (Assumptions 1 to 5) which is a precondition for building up the network system for unified business according to the present invention to simplify the description thereof.

(Assumption 1)

There are various types of LAN (Local Area Network), but it is assumed herein that the network system for unified business according to the present invention works under EtherNet (the most representative LAN which is a network developed jointly by Zerox Corp. and DEC Corp.).

(Assumption 2)

The network OS and the protocol are those of NetWare developed by Novel Corp.

(Assumption 3)

The workstation used in this network system is a personal computer developed by IBM or the compatible machine thereof.

(Assumption 4)

Also the server machine used in this network system is an IBM OC or the compatible machine thereof.

(Assumption 5)

DOS or Windows is installed as OS in the workstation.

(Assumption 6)

DOS or Windows is installed as OS also in the server machine.

(Assumption 7)

Also the application software works on DOS or Windows.

(Assumption 8)

The printer controller used in this network system is Post Script (page description language) developed by Abito Corp. which can treat all of the graphics, characters, images and alphabets/Chinese characters.

However, the present invention is not limited to the assumptions 1 to 8 above, and other ones each having the similar conditions can be used.

Also the LAN environment, which the network OS can work therein, can be developed as it is horizontally. A different type of LAN environment can also be connected to this network system by using a bridge or a router.

As for the network OS and the protocol, software such as LAN Manager developed by Microsoft Corp., MAC-OS by Apple Inc. and TCP/IP of UNIX can be migrated in the environment.

Various types of PC developed in Japan, Macintosh, and UNIX machines can also be used as the workstation and the server machine.

Also any type of printer OS and application software can be used on the condition that they can work in the environment.

Also any type of printer controller can be used so long as the controller can treat graphics, characters, images, and alphabets/Chinese characters comprehensively. Also a plurality of printer languages may coexist in this network system on the condition that the languages can comprehensively treat graphics, character, images, and alphabets/Chinese characters and the languages can freely be switched in use.

② General connections

Figure 1:
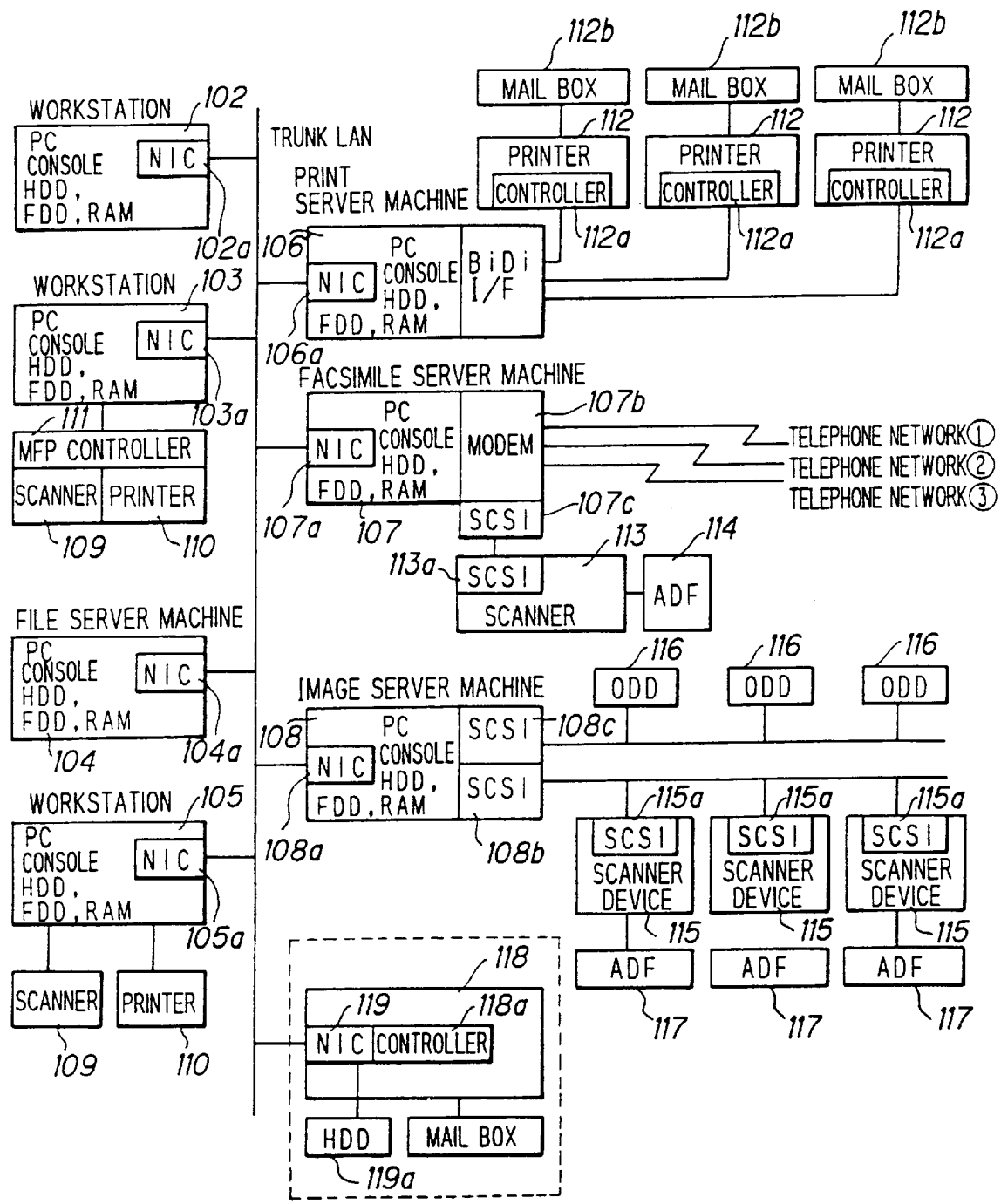
FIG. 1 is a view illustrating the general connections in a network system for unified business according to an embodiment of the present invention.

FIG. 1 shows general connections in the entire network system for unified business according to the present embodiment, and a plurality of PCs are connected to a trunk LAN 101 as workstations 102 to 108. Of the workstations, specific ones are assigned as a file server machine 104, a print server machine 106, a facsimile server machine 107, and an image server machine 108. It should be noted that, although a number of workstations is 7 herein, the number is not limited to 7.

NICs (Network Interface Card/Adaptor) 102a to 108a are attached to the workstations 102 to 108 respectively, which are connected to the trunk LAN 101. A type of this NIC is not limited to any particular one.

Also each of the workstations 102 to 108 comprises a basic system of PC, a hard disk device (HDD), a floppy disk device (FDD), and an required size of RAM. Also a scanner 109 as a local device dedicated to a self machine, a printer 110, and a multi-function peripheral (MFP) 111 may be connected to each workstation as shown, for instance, in cases of workstations 103 and 105.

Any illustration is not provided herein, but a control comprises such devices as a display unit, a keyboard device, and a mouse. There are such display units as a character display unit which can display only characters, or a graphical display unit which can display, in addition to characters, graphics, and also there are various types of character sets supported by the display units above, such as only alphabets, Chinese characters based on JIS, and those based on shift JIS. Furthermore there are various types of graphics based on different degrees of resolution (vertical/horizontal dot degree, monochrome/color etc.), but any type of display unit may be connected in this embodiment.

A plurality of printers 112 are connected via an interactive interface (BiDi I/F) to the print server machine 106. The interactive interface card is inserted into an extension slot of an PC, and a plurality of interactive interface cards may be inserted, and a plurality of printers 112 can be connected according to the number of the cards (herein 3 units). This print server machine 106 incorporates a print server software (PS) therein.

The printer 112 incorporates, for instance, a controller 112a which processes the post script language, and interactively transacts required data, commands and status with the PS (herein the print server machine 106). Also a mail box 112b is attached to the printer 112.

A facsimile server machine 107b, which is connected to the general public telephone network, is attached to the facsimile server machine 107. The modem card is inserted into an extension slot of an PC, and a plurality of cards may be inserted into the extension slot. With this configuration, the facsimile server machines can be connected to a required number of telephone networks (telephone networks ① to ③ in FIG. 1). This facsimile server machine 107 incorporates a facsimile server software (described as FS hereinafter).

Also a scanner 113 can be connected via SCSI 107c, 113a to the facsimile server machine 107. However, this connection is not always required. If necessary, and ADF (Automatic Draft Feeder) 114 may be attached to the scanner 113.

As a receiving function in a facsimile is an event which can not be forecasted, the facsimile must always be working, and it is necessary to make facsimile receiving operation work at the background or to use a multi-task OS in a PC (facsimile server machine 107) so that the facsimile can smoothly work even if a call comes in during input operation of the scanner 113.

A scanner 115 can be connected via SCSIs 108b, 115a to the imager server machine 108, and also an ODD (optical disk device) 116 can be connected via an SCSI 108c to the imager server machine 108. An SCSI card is inserted into an extension slot of an PC, and a plurality of cards can be inserted into the extension slot. Any number of units may be connected within a possible range. Also other type of a large storage capacity memory device may be connected in place of the ODD 116. Also, if necessary, an ADF (Automatic Draft Feeder) 117 may be connected to the scanner 115. It should be noted, however, that the scanner 115 and the ODD 116 are not always required to be connected and a scanner and a large storage capacity memory device provided at any location in the LAN can be used.

It should be noted that the file server machine 104 in this figure is a server machine required for NetWare (network OS and protocol developed by Novel Corp.). This is not essential in the present invention, so that description thereof is not provided herein.

Also a printer 118 shown in the right lower section of the figure shows a case where a print server software is migrated on the NIC 119. In this case, the NIC 119 is designed for private use, and the LAN side of the NIC 119 is directly connected to the trunk LAN 101, while the printer side of the NIC 119 is directly connected to the controller 118a. If necessary, the HDD 119a is used as the NIC 119.

③ Printing system

Figure 2:
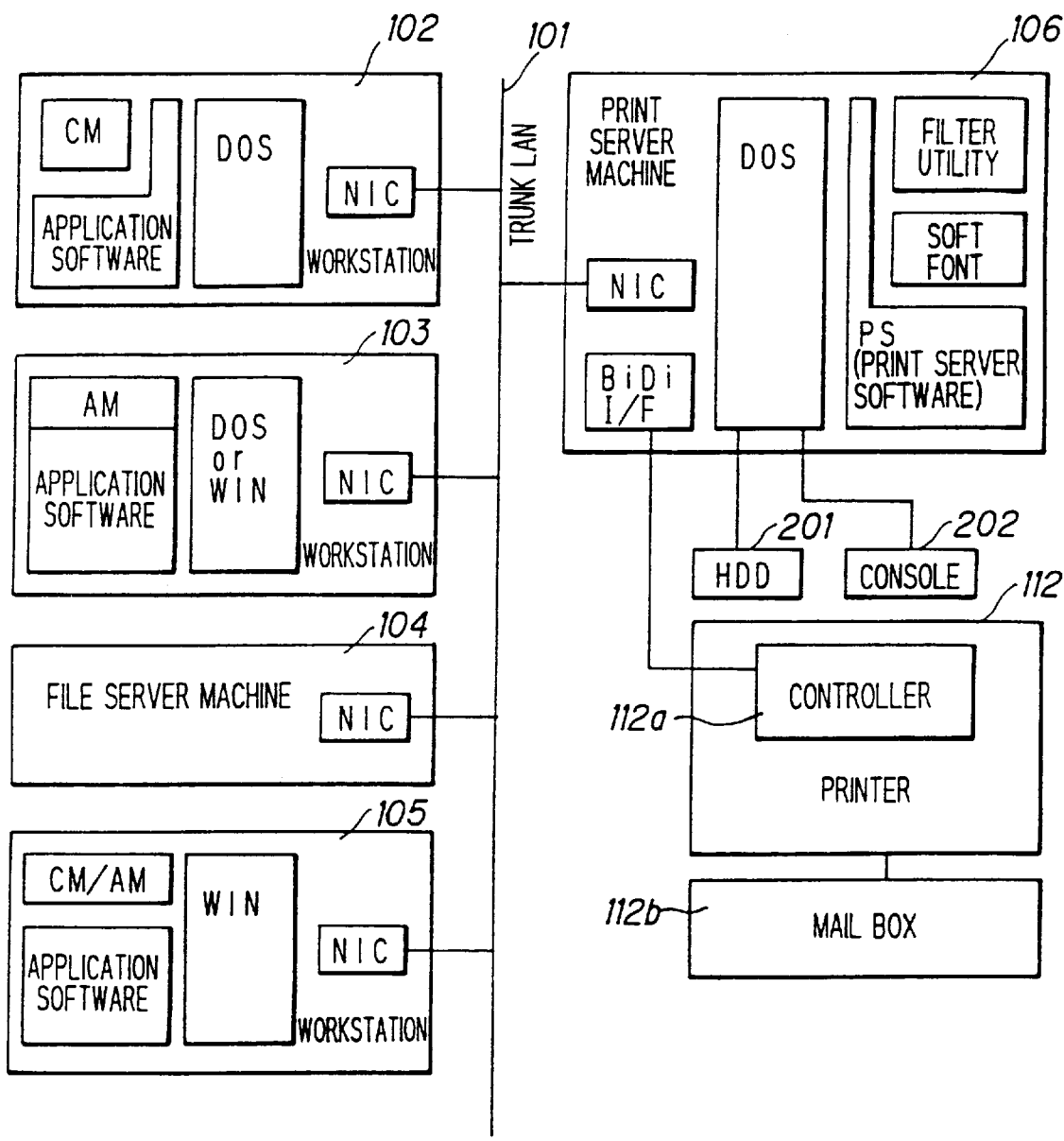
FIG. 2 is a view illustrating a portion of the printing system shown in FIG. 2 and required for explanation thereof.

Next description is made hereinafter for a printing system in the network system for unified business according to the present embodiment with reference to FIG. 2. FIG. 2 shows a portion of FIG. 1 required for explanation of the printing system.

Description of the printing system is made in the following order.

(3-1) Configuration of the printing system
(3-2) Accounting function
(3-3) Font management function
(3-4) Macro management function
(3-5) Mailing function
(3-6) Sorting function
(3-7) Filtering function
(3-8) Logging function (3-1) Configuration of the printing system As described above, the print server machine 106 is a PC, which works under the DOS environment. The PS controls a software font group and a utility software group. Also a HDD 201 and a console 202 may be connected to the print server machine 106, but this is not essential. The printer 112 incorporates PS2 (Post Script Level 2) as a printer language in the controller 112a.

As shown in this figure, although the workstations 102, 103, 105 work under DOS, some workstations work under Windows. There is a printer CM (Client Manager) as software for users of the workstations 102, 103, and 105 to communicate with the PS, while a printer AM (Administrative Manager) is used preferentially by managers among the users.

The printer CM is software which is run in parallel with an application software, and a program size of the printer CM under the DOS environment must be small enough not to infringe an memory area for application software. For this reason, under the DOS environment, the printer CM is supplied as TSR (TSR technique; a method of operating a program having nothing to do with an application temporarily from the console). On the other hand, there is no limit concerning the memory size under the Windows environment.

The printer AM works as software at an application level under both the DOS environment and the Windows environment. For this reason, as the printer AM is not run in parallel with an application, there is no limit over the program size. However, only one printer AM is available on one LAN, while the printer CM can be used in all workstations connected to the LAN.

In use of the printer CM, a menu temporally appears when a specific key is operated on a console of a workstation, and then request items for each user to the printer 112 can be set up, and the request items are managed as a print job style file (called PJSF hereinafter) on the PS. When a print file (data to be printed) is sent from a workstation, the PS transfers, before transferring the print file to the printer 112, the PJSF as a command to the printer 112. The PJSF is prepared and managed according to a number of users registered by the printer AM (namely a number of workstations), so that, even after other user used the printer 112, namely after the printing conditions were changed, a user can use the printer 112 reset according to the printing conditions for the user itself. For this reason, the printer 112 can be used like a printer dedicated to private use.

Main items which can be set or changed by the printer CM are as follows.

(1) Specifying one of a plurality of printers
(2) Specifying a printer language to be used
(3) Specifying a paper feed tray or a size of paper to be used
(4) Specifying a paper discharge tray to be used, or specifying a bin number in a mail box
(5) Specifying whether printing should be executed on both sides or on one side
(6) Specifying a software font to be downloaded
(7) Specifying a number of copies, or specifying whether sorting should be executed or not
(8) Specifying paper discharge offset or job assortment.

The PS demands the printer 112 to send a font downloaded by a user and data to be saved when a user is switched in the defined macro command and store the font and data for optimal management of printer environment for each user. Then, when the user again demands printing, the PS again loads the font and data to maintain the environment. This operation is called context switch.

If any error or trouble occurs in the side of printer 112, the PS transfers contents o the error or trouble as a message to a workstation of the user demanding printing during printing, or to a workstation of a user who demanded printing next if printing is not being executed. Also when the print job completes printing out, the PS makes a message telling that printing is over displayed on a display unit of a workstation of the user.

Also a user can know the current state and configuration of the printer 112 in detail using the printer CM. Also a user can check a queue of print jobs for all users.

The printer AM is a super set of functions of the printer CM, and can execute the following functions in addition to all the functions which the printer CM can execute.

(1) Setting a user name and a password for each user
(2) Calculation of a printing fee for each user
(3) Allocation of a printer mail box to each user
(4) Changing and canceling an order of all print jobs
(5) Diagnosis of initial setting in a printer (3-2) Accounting function Next description is made for the accounting function of the PS.

The PS has a function to accumulate data on a size and a number of sheets of paper used by each user and build up the data up to a database as a file (accounting data file). This file is updated each time each user demands a print job. Also the PS can accumulated data not only on a paper size but also on a software font and a micro file commonly used by any user for accounting. Also the PS can account for a quantity of toner consumed by each user (making use of, for instance, such a factor as a degree of complicatedness of an image as a standard for accounting).

Then the printer calls an accounting data file prepared by the PS, insert a unit price for each paper based on the data stored in the accounting data file, and executes calculation for accounting. This calculation for accounting is a job executed by an application software, and a new application may be prepared for the job, or an application software (such as, for instance, Lotus 1/2/3) sold in the market may be used for the job. For this reason, it is needless that it is convenient to use a format of an accounting data file which is the same as that employed in a general purpose application software.

(3-3) Font management function

Next description is made for the font management function.

A group of software fonts expected to be used by each user are stored in the PS. It is necessary to unify a format for storage, but the fonts themselves may be either those sold in the market or those prepared independently. Also the fonts can be downloaded to the printer 112 one by one, and when a user is switched to another user, as fonts to be expected by the new user have been registered, the PS must previously make an inquiry as to whether a font to be loaded to the printer 112 exists or not and load the font, before transferring the print job, if the required font does not exist. Checking as to whether a required font exists or not is executed to reduce a time required for downloading. If a RAM in the side of printer 112 has not an adequate storage capacity, the PS cancels fonts not required for the user to secure an empty memory space for the user.

The printer AM can load or cancel a software font to be registered in the PS. Also the printer AM can execute macro registration of fonts to be registered as those commonly available to all users. Also the printer can preferentially check, register, and cancel a registration list for each user.

The printer CM can read all lists for software fonts prepared in the PS, assort the fonts used by a user to several types of group, and register the font groups with a group name respectively. Also the printer CM allows switch setting to decide whether the font groups should be loaded in the printer 112 before a print job for the user is executed. However, if too many fonts are registered in a font group, it takes a long time to load the font group to the printer 112, which in turn lowers a throughput as a whole.

(3-4) Macro management function

Next description is made for the macro management function.

A group of macro files expected to be used by each user is stored in the PS. It is necessary to unify format for storage. Herein a macro file is defined as a fixed type of format (images such as a text having a fixed format, logo, and lines independently defined as a command and a database).

The macro files can be downloaded to the printer 112 one by one, and when a user is switched to another one, as a macro file to be used by the new user has been registered, the PS must make an inquiry as to whether any macro file to be loaded to the printer 112 exists or not previously, and load the macro file before transferring a print job if a required macro file does not exist. Checking as to whether a required macro file exists or not is executed to reduce the time required for loading. If the printer 112 has not an adequate storage capacity in the RAM, the PS cancels macro files not necessary for the user to secure an empty memory space.

The printer AM can prepare, register or delete a macro file to be registered in the PS. Also the printer AM can execute macro registration of a file as a macro file commonly used by all users. Also the printer AM can preferentially check, register, or delete a registration list for each user.

The printer CM can read all lists of macro files prepared in the PS and also register a macro file to be used by a self machine as a macro file. Also the printer CM can execute switch setting as to whether the macro file is to be loaded or not to printer 112 before executing a print job for the user in a menu on the printer CM.

(3-5) Mailing function

Next description is made for the mailing function. The printer 112 becomes more convenient to use as a whole when a multi-stage paper discharging apparatus is attached thereto as a mail box 112b.

The PS includes bin specification for each user in the PJSF, so that, when the printer 112 has the mail box 112 attached thereto, paper can be discharged to a tray (bin) dedicated to private use by the user.

The printer AM has a function to forcefully allocate a bin to each user, and also a function to inhibit change of the allocation by each user.

The printer CM only checks a number allocated to a bin for each individual user when the forceful allocation has been executed in the printer AM, but can freely select a bin for each user if not forcefully allocated. Then it is possible to check whether paper is present or not in a bin, namely a state of the bin. It should be noted that the state of each bin (whether paper is present or not) is detected by using a paper detecting sensor (not shown) provided in each bin in the mail box 112b.

(3-6) Sorting function

Next description is made for the sorting function.

When a request for sorting is made from the printer CM, the PS checks which bins in the mail box 112b are empty, executes chaining for (decides a chain of) empty bins, and report the chaining state to the printer CM. Also the PS specifies a number of copies as well as a chain in the train specified by the printer CM in the printer 112, and starts printing. When a print job for the demanded sorting is complete, the PS report end of the job print to the printer CM and release chaining in the tray. If chaining in the tray has been specified, when printing is requested from other user, the job is retained until chaining is released.

The printer 112 executes printing by a number of copies specified according to specification of chaining in the tray from the first page.

The printer AM has a privilege to specify to which users the sorting function should be allowed, check the situation and forcefully release the specification.

The printer CM can check whether the sorting function has been allowed or not and execute the sorting function. Also the printer CM can check the bin chaining situation.

When executing sorting, it is difficult to previously know a total number of pages( because this job is executed and it is difficult to make a determination concerning it from the outside). For this reason the possibility that the total number of pages is larger than a number of bins in the entire mail box 112b and bins are short is very high. In this case, other pool tray is defined in addition to bins in the mail box 112b, and pages exceeding the total number of available bins are discharged to this pool tray. Also when this pool tray has an offset stack function, jobs are assorted to each page making use of this function. If no job assortment is executed, preparatory pages (paper different from the practical print form) is forcefully discharged for execution of job assortment. In this case, if there are a plurality of paper feed trays in the printer 112, color paper is set previously and this color paper is forcefully discharged for execution of job assortment.

(3-7) Filtering function

Next description is made for the filtering function.

A filter is a software to store a block of data (data file) in a data file having a different form (a program with a specific algorithm described therein). The filter defined herein works under control by the PS.

The PS has information as to by what type of printer a print file transferred by a user is printed and what type of printer language a printer connected to the PS is used (In this embodiment, the post script printer). For this reason, if the transferred print job file is described with the post script, the file can be transferred to and printed by the printer as it is smoothly.

For instance, if a print file transferred from a user is described so that the file is printed by a dot printer, the file printed in the post script can not be printed as it is, the post script printer language must be converted to another one. However, the PS in this embodiment automatically executes this job. When viewed from a user's point of view, there is no problem so long as the final print out on paper is identical.

Examples of filter required in association with the PS are listed below.

(1) A filter for conversion from the PCL printer language developed by Hewlet Packard Corp. to the post script language (2) A filter from conversion from various types of bit printer language to the post script language (3) A filter for conversion of a datacompressed luster image to that based on the post script language (4) A filter for conversion a luster image not based on data compression to that base don the post script language.

(3-8) Logging function

Next description is made for the logging function.

The logging function is used to collect data on services and use (how the printer is used), and this function is very important for designing and the field service plan in the figure. In this embodiment, all prints at the printer 112 are printed through the PS. Also all information concerning errors which occur in the printer 112 come into the PS. So a number of pages printed under each printing condition (such factors as for paper feed tray, paper discharge tray, double-sided/single-sided print, offset function (right/left)) is counted. A number of pages for each print job from each user (data on how may pages are printed upon a request for printing), in other words times of job for 1 page/job, 2 pages/job, 3 pages/job . . . , and times of errors generated in each printer are accumulatively counted.

The tabular computing described above is a job in the printer AM, and the PS makes the information files, so it is possible to prepare a table with an application soft dealing with a general spread sheet by calling the information file from the printer AM. If it is necessary, printing out data in the information file is also possible.

It should be noted that the operation of the printing system described above does not change even when the print server software is migrated to the NCI 119, and in this case a workstation (PC) used as the print server machine 106 is not required, which is useful for simplification of the system and space saving.

(4) Facsimile system

Figure 3:
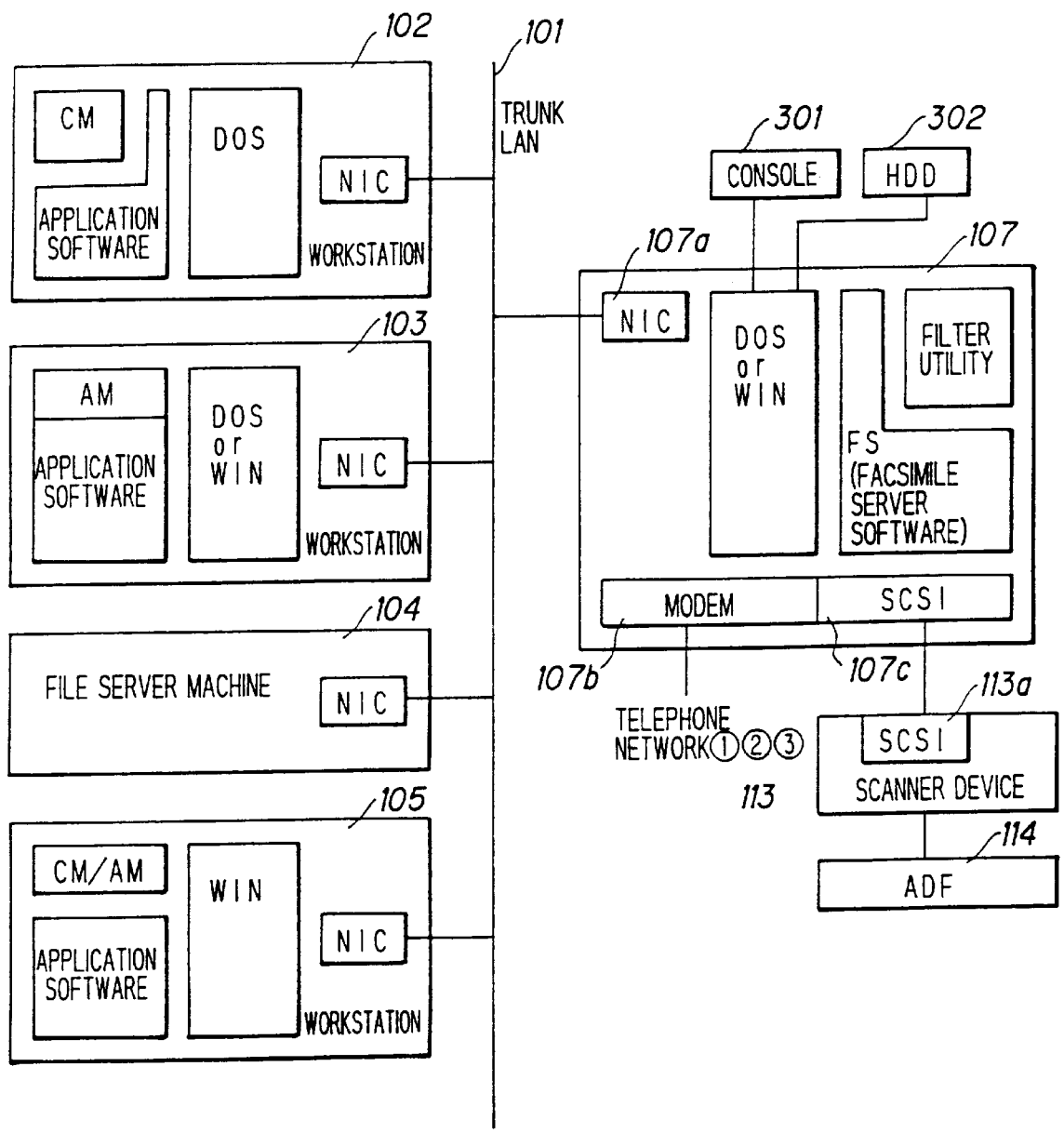
FIG. 3 is a view illustrating a portion of the facsimile system shown in FIG. 2 and required for explanation thereof.

Next description is made for a facsimile system on the network system for unified business according to this embodiment is made with reference to FIG. 3. FIG. 3 is a view illustrating a portion in FIG. 1 required for explanation of the facsimile system.

Next description is made for the facsimile system in the following order.

(4-1) Configuration of facsimile system (4-2) Sending/receiving image data (4-3) Sending/receiving character and graphic data (4-4) Received facsimile data managing function (security function)

(4-5) Copying function (4-1) Configuration of the facsimile system

As described above, the print server machine 107 is a PC and works under DOS or Windows environment. Namely the FS works on DOS or Windows. The FS controls a group of utility software and a group of software controlling interaction with a console 301 attached to the facsimile server machine 107 (called TXCON hereinafter). Also a group of software controlling the facsimile modem 107*b* and the scanner 114 each connected to the FS is included therein. Also a HDD 302 can be connected to the facsimile server machine 107, but it is not essential.

The FS accumulates data received through the modem 107 sequentially in a buffer memory. Also data such as a phone number of a sender of received data, ID if any, date and time when the data is received is stored in a file, which is reserved as a data reception list file. This list can be displayed in each workstation by making use of the facsimile CM described hereinafter.

As shown in the figure, some of the workstation 102, 103, 105 work on DOS, while the remaining workstations work on Windows. The facsimile CM (CM: Client Manager) is software which users of the workstations 102, 103, and 105 use for communications with the FS, while the facsimile AM (AM: Administrative Manager) is software which managers among the users preferentially use.

The facsimile CM is software which is run concurrently with an application software, and a program size of the facsimile CM under DOS environment must be small enough not to infringe a memory space for the application software. For this reason, under DOS environment, the facsimile CM is supplied as TSR (TSR technique: a method of temporally operating another program having nothing to do with any application program from a console). On the other hand, there is not any specific restriction on the memory size under Windows environment. The facsimile AM works as a software on an application level even under Windows environment. For this reason, the facsimile AM is never run concurrently with any application software, and there is no restriction over the program size. However, only one facsimile AM is used on one LAN, and the facsimile CM is used in all workstations connected to the LAN.

With the facsimile CM, when a specific key operation is executed on a console of a workstation, a menu appears temporally, and the following operations can be carried out during "receiving" and "sending".

<Receiving>
(1) Checking whether any data to be received by a user is present or not
(2) Instructing display on a display unit and provision of the display
(3) Instructing a request of output to a printer
(4) Deleting facsimile data sent to a user
(5) Saving a file for a user
(6) Instructing retransmission of data to another user <Sending>
(1) Specifying a phone number of receiver of data to be sent. A plurality of phone numbers can be set in case of broadcasting the data.
(2) Specification of time
(3) Setting a type of data to be sent
(Format, file name, a place for storage etc.)

When any error or trouble is generated in the FS, the FS transfers contents of the error or the trouble as a message to a workstation of the user who demanded the data during facsimile transmission, or to a workstation of a user who demanded transmission next if not facsimile transmission is not being executed. Also when transmission of a facsimile job is over, a message telling end of the facsimile job is displayed on a display unit of a workstation for the user.

Also a user can know the current state and configuration of the facsimile server machine 107 in detail by using the facsimile CM. Also an order of the facsimile job for the user can be changed or deleted. Also a queue for facsimile jobs for all users can be checked.

The facsimile AM is a super set of functions of the facsimile CM, and has the main functions as described below, in addition to all the function of the facsimile CM.

(1) Setting a user name as well as a password for each user
(2) Calculation of a printing fee (in case of facsimile) for each user
(3) Calculation for accounting a telephone fee for each user
(4) Allocating a printer mail box for each user
(5) Changing and deleting an order of all facsimile jobs and forcefully deleting received images
(6) Assigning a name to each facsimile modem
(7) Initially setting and diagnosing a facsimile modem
(8) Setting ID for each user
(9) Preparing and registering a cover letter The TXCON transfers a manuscript using the scanner 113 connected to the facsimile server machine 107. Operation of the scanner 113 is carried out by interacting with the console 301. The main functions of the TXCON are as follows.

(1) Specifying a phone number of a receiver, or phone numbers of receivers when broadcasting a message
(2) Specifying a time
(3) Setting a density of images read by the scanner
(4) Setting a resolution of a scanner in reading
(5) Setting an ID for transmission (4-2) Sending/receiving an image data The FS sequentially accumulates data received through the modem 107*b* in the server machine 107. Also such data as a phone number of a sender of received message, ID if nay, a date and time of reception is stored in a file as a reception list file. This list can be displayed in each workstation by using the facsimile CM described hereinafter.

Also the FS can check whether each workstation can display image data or not (whether each workstation is a character terminal or a graphics terminal), and also can check conditions for display including the resolution if the workstation is a graphics terminal. Also the data as described above can be stored as a configuration list file. The facsimile AM can also be set up from the TXCON. Also functions of the printer 112 can be listed and stored simultaneously. Also when a request for display is sent through the facsimile CM of workstations 102, 103 or 105, the facsimile AM convert data to those based on a required resolution referring to the lost and transfer the image data. A filter executing the conversion is under control by the FS, and is automatically changed. If a workstation is a character terminal, it is impossible to transfer a received message to the workstation for displaying the message on the display unit, so the message is printed out by the printer 112 so that a user of the workstation can read the message.

When sending, image data read from the scanner 113 or image data transferred from any of the workstations 102, 103, and 105 is sent according to a resolution required for a receiver of the image data. This filter for converting a resolution is also under control by the FS.

When printing out received graphic data, a filter to convert a format of the received graphic data to that for graphic expression in a printer language installed in the printer 112. Also this filter is under control by the FS, and automatically changes the format to send the graphic data to the printer 112 (The printing conditions then are the same as those for functions of the PS).

It should be noted that filters under control by the FS are as follows.

(1) Filter for compressing or prolonging image data (such as MH,MR, and MMR)
(2) Filter for writing, when sending a message or image data, such data as a receiver's phone number, time of reception, and ID (3) Filter for writing, when receiving a message or image data, such data as a receiver's phone number, time of reception, and ID (4) Filter for automatically inserting a cover letter Also description is not made herein, it is assumed that the data transaction record managing function which a general facsimile machine has is incorporated therein and the data transaction record can be checked or transferred to the FS for printing out by using the facsimile AM or the TXCON.

(4-3) Sending/receiving character or graphic data

Next description is made for operation for sending or receiving character or graphic data. Data to be sent or received by using the facsimile modem 107b include not only general data, but also character and graphic data. Sometimes it may be necessary to send a manuscript prepared with an application software (for instance, a word processing function) on a workstation as it is without printing it out previously. Then the receiving side is not always limited to a receiver which can process both characters and graphics, and the receiver may be an ordinary type of G3 image facsimile machine or one which can process specific character or graphic data. Functions in the receiving side can be checked prior start of facsimile transmission according to the protocol.

It is assumed that the FS has a function to check what functions a receiver has. When receiving a message of image data, a character/graphic data processing function being supported by a self system is noticed to a sender of the message or image data, and the supported function satisfies the requirements from the sender, transmission of the character or graphics is allowed. Also when sending a message or image data, types of character and graphics being supported by a self machine is reported to a receiver, and if the receiver can satisfy the requirements, the message or graphic data is sent in the required format, and if the receiving side can support only ordinary image data, the message or the graphic data is converted to and sent as image data. When characters or graphic data is received, the data is stored in a buffer memory of the facsimile server machine 107, and when the facsimile CM requests display thereof, if a workstation has a function to display the data as it is, the data is transferred as it is, and if the workstation can process only image data, the data is once transferred into the PS in the print server machine 106, where the data is converted to image data, said image data is again sent back to the FS and converted to those having a resolution do that the data can be processed in the workstation, and then transferred to the workstation.

Also when sending a message or graphic data, if character of graphic data transferred from a workstation can not be sent as it is, the data is once transferred into the PS of the print server machine 106, where the data is converted to image data, said image data is returned to the FS, and is transferred as image data for a facsimile machine.

It should be noted that the PS does not transfer character or graphic data to the printer controller 112a controlling the printer 112 to convert character or graphic data to image data and print the image data as it is on paper, but ask the image data to be returned to the PS once and then transfers the image data to other sections.

(4-4) Received facsimile data managing function (Security function)

The FS shall have a function to insert ID for each user to data to be transmitted and a function to detect the ID later. Also the FS has a list file storing user names and their IDs stored therein, and notice of received image, ID of which is detected, is made to the user having the ID, so that each user does not have to check received facsimile data not necessary to the user.

Also it is possible in the FS to record user access data including user name and time of access in a received facsimile data list file (a file in the facsimile server machine 107, and for this reason it is possible to check whether data was read by any user or not, or whether the data was read by any user having nothing to do with the data or not, and to execute notice or processing (deletion), when the data was not read by any user, through the facsimile AM. This function is very important for security.

(4-5) Copying function

Next description is made for the copying function.

In the FS or TXCON according to this embodiment, a copying function can be realized by using the scanner 113 and the print server machine 106. This function is almost the same as image data transmission in a facsimile machine, and to realize the copying function, a function setting menu having the following menu items has only to be added to the TXCON.

(1) Specifying a number of sheets of paper to be copied
(2) Specifying a paper size
(3) Specifying a bin for output
(4) Specification of sorting
(5) specifying a double side or a single side copy
(6) Specifying a density for reading
(7) Specification of enlargement or size reduction Also if the paper output direction in the printer 112 is different from the direction in which a manuscript is read by the scanner 113, automatic control is provided so that the manuscript will pass a length/width converting (rotating) filter under control by the FS. Then the accounting function is executed like in the FS.

(5) Electronic circulation system

Figure 4:
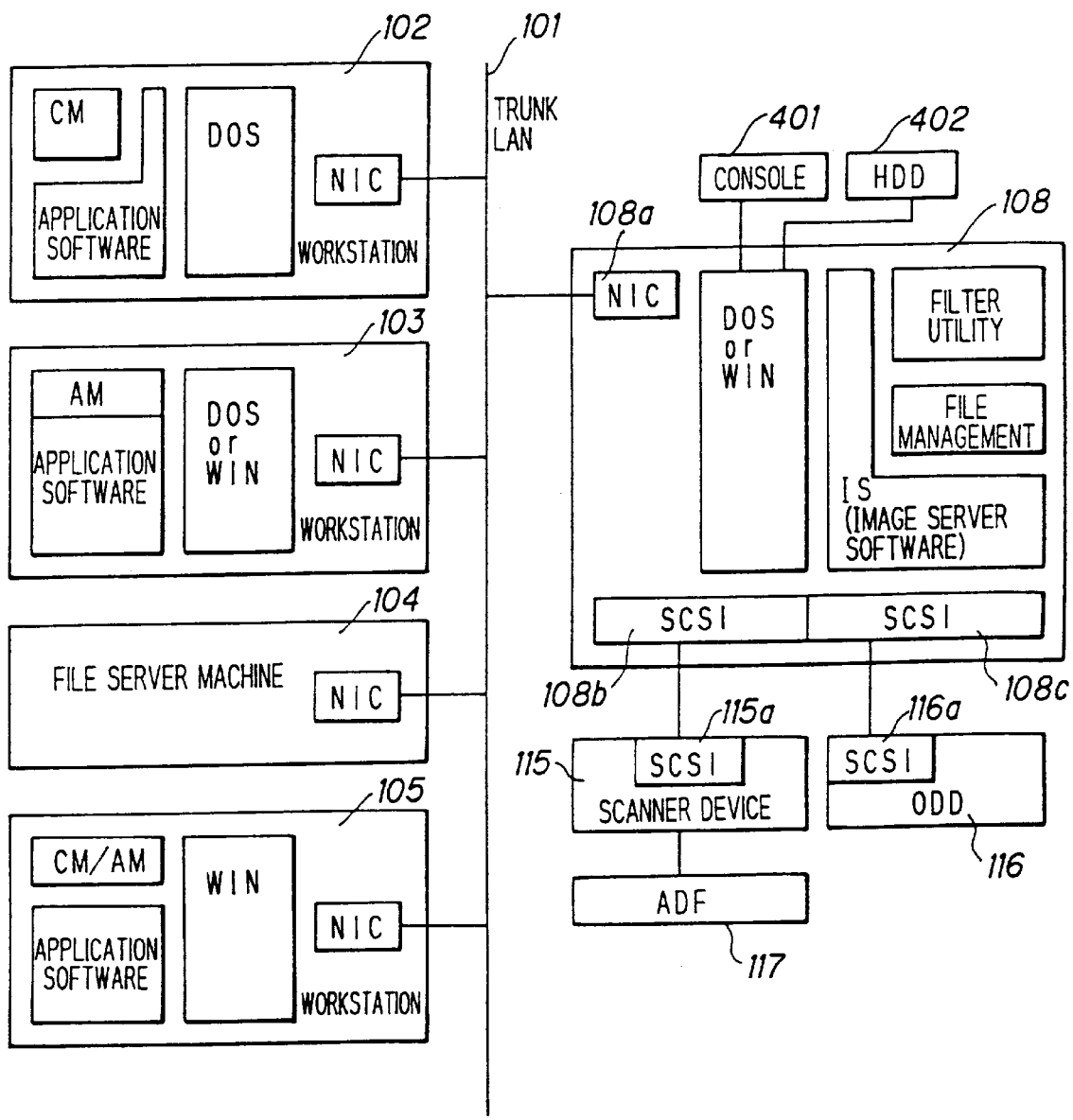
FIG. 4 is a view illustrating a portion of the electronic circulation system shown in FIG. 1 and required for explanation thereof.

Next description is made to the electronic circulation system in the network system for unified business according to this embodiment of the present invention. FIG. 4 shows a portion of FIG. 1 required for explanation of the electronic circulation system. The electronic circulation system is an example of a image file/retrieval system. Herein a term of image retrieval file/retrieval system is too broad, so the word of electronic circulation system s used, but it is needless to say that other various example of use are conceivable.

Next description is made for the electronic circulation system. As described above, the image server machine 10 is a PC, and works under DOS or Windows environment. Namely, the IS works on DOS or Windows. The IS controls a group of utility software and a group of software for interaction with a console attached to the image server machine 108 (called ISCON hereinafter). Also the IS controls a group of software controlling the large storage capacity device (ODD) and the scanner 115 each connected to the IS. Also a HDD 402 can be connection to the imager server machine 108, which is, however, not essential. It should be noted that the reference numeral 116a indicates an SCSI in the ODD 116.

As shown in the figure, some of the workstations 102, 103, 105 work under DOS, but the remaining ones work under Windows. There is the image CM (Client Manager) as software for users of the workstations 102, 103, 105 to communicate with the IS, and software which managers among the users can use preferentially is the image AM (Administrative Manager).

The image CM is software concurrently run with an application software, and a program size of the image CM under DOS environment must be small bought not to infringe a memory area for the application software. For this reason, under DOS environment, the image CM is supplied as TSR (TSR technique: A method of temporally operating a program having nothing to do with the application software on a console. On the other hand, there is no specific restriction over the memory size under Windows environment.

The image AM works as software at an application level under both DOS and Windows environment. The image AM is never run concurrently with an application software, so that there is no restriction over the memory size. However, only one set of image AM is used on one LAN, while the image CM is used on all workstations connected to the LAN.

In the image CM, when a particular key is operated on a console of a workstation, a menu appears for s short period of time, when the following operations can be carried out.

(1) Checking whether any circulation to a user is present or not (2) Entry of a result of checking whether the circulation has been read or not (3) Specifying a request for output to a printer (4) Saving data in a self file If any error or trouble occurs in the side of IS, the IS transfers contents of the error or trouble as a message to the workstation for the user who requested access to the IS.

Also a user can know in detail the current state and configuration of the imager server machine 108 by using the image CM. Also if there is a circulation which a user should read in a list, the user can make the circulation displayed n the user's display unit. If necessary, it is also possible to print the circulation.

The image AM is a super set of the functions of the image CM, and has the main functions as described above in addition the functions of the image CM.

(1) Setting a name and a password for, each user (2) Allocation of printer mail box to each user (3) Specifying to which user the circulation is to be circulated (4) Checking whether each user with a circulation circulated to has finished reading the circulation or not (5) Deleting or storing a circulation In the IS side, there is a file used to prepare a list of object users for each circulation and to check whether each of the object users has read a circulation or not. This list file can be prepared, checked, and changed with the image AM or the ISCON. A manager checks this list file, issues a prompt to users who have not read the circulation, and when all the users have finished reading the circulation, and decides whether the circulation should be stored as a file or deleted.

The ISCON is used to store a manuscript in the ODD 116 which is a large storage capacity memory device using the scanner 115 connected to the imager server machine 108. Operation of the scanner 115 is executed interacting with the console 301. The ISCON has the main functions as described above.

(1) Setting a directory for image files and deciding file structure (2) Setting a file name and partial edition thereof (3) Setting a density for reading by the scanner (4) Setting a resolution for reading by the scanner (5) Start/stop of reading Also the IS can check whether a workstation can display image data or not (whether the workstation is a character terminal or a graphic terminal) and confirm the display conditions including the resolution if the workstation is a graphic terminal. Also the information can be stored and managed as a configuration list file. Setting for the IS may be made from either the image AM or the ISCON. Also functions of the printer 112 can be listed and stored simultaneously. Also when a request for display comes through the image CM of each of the workstations 102, 103 and 105, the IS converts the image data according to a required resolution for the workstation referring the list and transfers the converted image data. A filter which executes this conversion is under control by the IS, and is automatically changed. If the workstation is a character terminal, as it is impossible to transfer a received message as it is to the workstation and make the message displayed on the display unit, so that the received message is printed by the printer 112 so that the user can read the message.

Also, when printing out necessary graphic data, a filter to convert the graphic data to those based on a format for graphic expression in the printer language installed in the printer 112 is required. This filter is also under control by the IS, which automatically converts the graphic data format and transfer the data to the printer 112 (The printing conditions then are the same as the functions in the PS).

It should be noted that the following filters are under control by the IS.

(1) Filter to compress or prolong image data (such as MH, MR, or MMR)

(2) Filter to convert image file to character/data (such as OCR or Illustrator developed by Avido Corp.)

For instance, a removable floppy disk device, or an optical disk device is attached to the image server machine 108, and any of an image file, a character file, and a graphics file supplied from the outside can be circulated as it to the image server machine 108. The most representative one is a circulation concerning patent by means of optical disk, and especially as it can be expected that general patent publications will be provided in the form of CD (Compact Disk), its usefulness is very high.

The data supplied as input from the outside is not always limited to general image data, and include character and graphic data. When character/graphic data is stored in a memory unit in the image server machine 108, if the image CM requests display of the character/graphic data, the character/graphic data is transferred as it is provided that each workstation has a function to display the character/graphic data as it is, or the character/graphic data is once transferred to the PS, where the character/graphic data is converted to image data, which is again returned to the IS, and the IS again converts the data to those having a resolution allowing treatment in the workstation and then transfer the data to the workstation.

In this embodiment, as described above, an I/O device is separated from a convertor, and the convertor is provided as software to a personal computer, capability of which has remarkably been improved in recent years, so that the cost/performance ratio as well as quality of an I/O device can be improved with unified interface and without lowering the functional level.

Also a plurality of I/O devices can be connected to each other regardless of their functions and types, so that LANs, Operating Systems (OS), and network protocols obtainable in the market (namely existing products) can be used, which means easiness in building up a network system.

Also it is possible to expand a printing system, a facsimile system, and an electronic circulation system from time to time without changing an I/O device already installed therein, so that there are the following merits.

(1) The network system according to the present embodiment can be installed as it is in the LAN environment already installed, so that investment for setting up a new environment or introducing additional facility is not necessary.

(2) A workstation or an application which has been used for a long time can be used as it is, so that the convenience is very high.

(3) An appropriate scale can be selected according to a user's necessity, and also the scale can be changed if it is required.

(4) The system can be expanded step by step, so investment in facilities can be carried out according to a plan.

Also manufacturers developing a network system or an I/O device can expect the following merits.

(1) Products obtainable in the market can be used as they are without developing LAN or other system components, so that an amount of money required for development is small.

(2) Step-by-step development is possible, so development can be made according to a plan, which in turn means the possibility to reduce risks.

(3) Systems and I/O devices can be developed, manufactured, and marketed independently.

Figure 5:
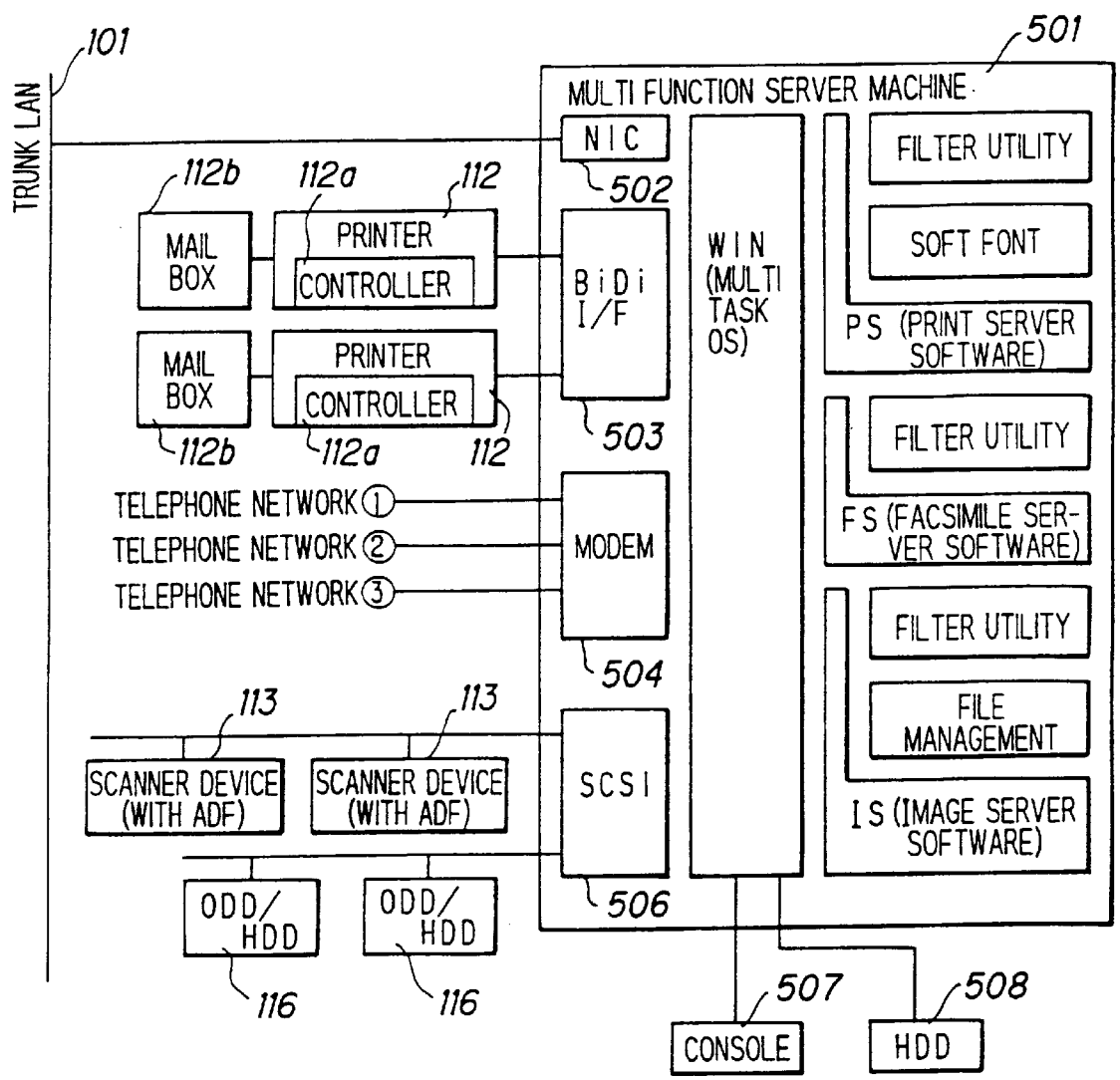
FIG. 5 is a view illustrating configuration of a network system for unified business with a print server software (PS), a facsimile server software (FS), and an image server software (IS) all incorporated in a workstation.

FIG. 5 shows another embodiment of the present invention. As described above, the print server/software (PS), facsimile server software (FS), and image server software (IS) are software concepts, and if the server machine is powerful and the OS is a multi-task one, the 3 types of server software and the filter software can be installed and run in one server machine.

Concretely as shown in FIG. 5, the print server software (PS), facsimile server software (FS), and image server software (IS) are installed in the multi-function server machine 501 which is a workstation having a multi-task OS.

To the multi-function server machine 501 is attached the NIC (Network Interface Card/Adaptor) 502, which is connected to the LAN 101. Also a plurality of printers 112 are connected to each other through the interactive interface (BiDi I/F) 503.

Also to the multi-function server machine 501 is attached the facsimile modem 504 which is connected to the general telephone network. Also the scanner device 113 and the ODD (or HDD) 116 are connected via the SCSI 506 to the multi-function server machine 501. The reference numeral 507 denotes a console, while the reference numeral 508 denotes an HDD.

With the configuration as described above, it is possible to unify server machines into one network system, which enables simplification of the system configuration and reduction of required space. It should be noted that operation of the multi-function server machine 501 is a combination of software functions of the PS, FS and IS, so that description thereof is omitted herein.

Also it is possible to improve the operability by integrating the printer CM, facsimile CM, and image CM into a multi-CM and also integrating the printer AM, facsimile AM, and image AM into a multi-AM and installing the multi-CM and multi-AM in a workstation respectively.

As clearly understood from the above description, in the network system for unified business according to the present invention, a printing system, a facsimile system, a copying system, and an electronic circulation system can be expanded from time to time according to the necessity without changing an I/O device already installed.

Also a printer connected to the network system can commonly be used by a plurality of users, and convenience as well as security like those in a printer dedicated to private use can be provided to users.

Also it is possible to easily expand or add a network system.

Also it is possible to easily connect an I/O device already installed therein to the network system without adding any modification to the device. Also it is possible to easily add an advanced and high value-added I/O device newly developed or put into the market to the network system.

Also it is possible to reduce cost and time required for development of an I/O device and a convertor connected to the network system.

Also the network system for unified business according to the present invention comprises a print server machine which is a workstation having a function to store and maintain a driver software supporting interactive communications in the foregoing printer and printing conditions for each user as a job style file, a function to report, when an error occurs in the printer, the error to a user demanding a print job, a function to store print data demanded from each workstation sequentially as a queue and send the data to a printer, a function to send the data to the printer, and a function to send, before sending the data, a job style file stored with the name of user demanding the print data to the printer all incorporated as a print server software; a plurality of workstations each incorporating therein a menu software having a function to call out a job style file for users of a self machine of job style files for individual users residing the print server software, change the contents and again store the file in the print server software; and a specific workstation incorporating therein a menu software for managers having a function to preferentially change or delete an order of print data in said queue, so that the current state of a printer can be checked from a workstation, remote control for the printer can be executed also from the workstation, and a plurality of user can use the printer as if the printer were dedicated for private use by each user.

Also a network system for unified business according to the present invention comprises a print server machine which is a workstation having a function to store and maintain a driver software supporting interactive communications in the foregoing printer and printing conditions for each user as a job style file, a function to report, when an error occurs in the printer, the error to a user demanding a print job, a function to store print data demanded from each workstation sequentially as a queue and send the data to a printer, a function to send the data to the printer, and a function to send, before sending the print data, a job style file stored with the name of user demanding the print data to the printer all incorporated as a print server software; a facsimile server machine which is a workstation having a function to temporally store a driver software used for communications with a modem installed in the print server machine and received facsimile data, a function to report whether received facsimile data is present or not to each workstation, a function to make an inquiry as to whether each workstation can display image data or not as well as the required resolution and store a result of the inquiry, a function to transfer received image data through the printer server machine to the printer, and a filter function to convert the received image to that based on the printer language installed in the printer all incorporated as a facsimile server software; a plurality of workstation each incorporating therein a menu software having a function to call out a job style file for users of a self machine of job style files for individual users residing the print server software, change the contents and again store the file in the print server software as well as a facsimile menu software having a function to check whether facsimile data to be received is present or not, a function to display, when display of a received image is possible, the received image, and a function to specify print out of the received image; and a specific workstation incorporating therein a menu software for managers having a function to preferentially change or delete an order of print data in said queue as well as a menu software for facsimile managers having the same functions as those in the facsimile menu software and a function to preferentially delete the received image, so that facsimile data received in a workstation can be seen either as a soft copy on a display unit of a self workstation or as a hard copy printed out from the printer according to the necessity. For this reason, saving of resources such as paper is promoted, which in turn promotes reduction of paper used in an office.

Also the network system for unified business according to the present invention comprises an image server machine which is a workstation with a function for format management and file registration such as changing a file name, sorting or deleting a file, a function to inform a user to whom a circulation file being stored therein is to be circulated of the fact that there is information to be read by the user, a function to supply a result of checking as to whether circulated information was read by each user as input to all users to whom the information is to be circulated, a function to transfer, when specified, the circulated file to a printer or a specified print server machine, a function to execute format management and file registration management in an interactive mode with a console and set up users to whom information is to be circulated all installed as an image server software and a function to check whether the file has been read or not; and a plurality of workstations each having a function to receive a report from the image server machine telling that there is information to be read, a function to display registered image files, a function to report after reading information that reading is finished, and a function to request print out of the circulation file, so that an electronic circulation system can easily be introduced into the existing network, time required for circulation of an item to be circulated to users can be reduced, and the risk of losing the circulation is prevented, which in turn promotes realization of a paper-less office.

Also the network system for unified business according to the present invention comprises a server machine which is a workstation incorporating therein a print server software having a function to store and maintain a driver software to support interactive communications in the printer and printing conditions for individual users as job style files, a function to report, when any error occurs in the printer, the error to a user requesting a print job, a function to store print data requested from each workstation as a time-seriesed queue and send the data to the printer, a function to send print data to the printer, a function to send the print data to the printer, and a function to transfer, before sending the print data to the printer, a job style file being stored with a user name for the print data, a facsimile server software having a function to temporally store a driver software for communications with a modem installed in the print server machine as well as received facsimile data, a function to report each workstation whether facsimile data to be received is present or not, a function to make an inquiry as to whether each workstation can display image data or not as well as the resolution, if possible, and store the result, a function to transfer received images through the print server machine to the printer to the printer, and a function to convert received images to those based on the printer language installed in the printer, and an image server software having a function for format management and file registration such as changing a file name, sorting or deleting a file, a function to inform users to whom a circulation file being stored is to be circulated of the fact that there is information to be read, a function to input a result of checking as to whether each user read the information into a list of all users to which the circulation file is to be circulated, and a function to transfer, when specified, the circulation file to the printer or a specified print server machine, and also having a multi-task operating system; a plurality of workstations each incorporating therein a menu software having a function to select and call a job style file for users of a self machine from job style files for individual users residing in the print server software, change the contents and again store the file in the print server software, a facsimile menu software having a function to check whether any facsimile data to be processed has been received or not, a function to display, when it is possible to display received images, the received images, and a function to specify print out of the received images, and an image file menu software having a function to receive a report from the imager server machine telling that there is information to be read, a function to display image files being registered therein, a function to report, after reading the information that reading the information is finished, and a function to request print out of the circulation file; and a specific workstation incorporating therein a menu software for managers having a function to preferentially change or delete an order of print data in a queue, a menu software for facsimile managers having the same functions as those in the facsimile menu software as well as a function to preferentially delete received images, and a menu software for image file manages having a function to execute format management, file registration management, and specification of users to whom a circulation file is to be circulated in an interactive mode with a console and a function to check whether reading is over or not, so that a multi-functional network system based on simple configuration and requiring only a small space can be provided.

Also in the network system for unified business according to the present invention, a menu software, a facsimile menu software, and image file menu software each described above are unified into a software for users (CM: Client Manager) and also the menu software for managers, menu software for facsimile managers, and menu software for image file managers each described above should preferably be unified into a software for managers (AM: Administrater Manager), so that the operability and convenience of the network system for users can be improved.

Also the network system for unified business according to the present invention incorporates the print server software in a network interface card (NIC), so that the system can be simplified without requiring a dedicated workstation as a print server machine.

Also in the network system for unified business according to the present invention, the print server software has a function to accumulate a size of paper used by each user as well as a number of used sheets and store it as an account file and the menu software for managers has a function to read an account file in the print server file and prepare an account list for each user and a function to clear data in an account file for each user, so that a number of sheets printed, a size of paper used by each user, and a frequency of use of font macro which can be used by all users can be counted accumulatively, which enables accurate cost management.

Also in the network system for unified business according to the present invention, the print server software has a function to store soft fonts for downloading, a function to load stored fonts one by one to the printer, and a function to stop loading, when a required font has been stored in the printer, the corresponding font; the menu software for managers has a function to register a new software font as a font software in the print server software; and the menu software has a function to read a software font owned by the print server software and register a font used by a self machine as a group in the job style file, so that the convenience can be improved by installing system components which each user has been using from applications in the existing LAN on servers for enabling shared user of the system components by all users, and also the cost for purchasing software resources can largely be reduced.

Also in the network system for unified business according to the present invention, the printer has a multi-stage output tray as a mail box; the print server software has a function to specify, before outputting the print data, a bin of the multi-stage output tray allocated to each user and discharge paper to the bin, and a function to output mail for a user with no allocated bin to a specified pool tray; the menu software for managers has a function for a manager to decide which output bin should be allocated to each user; and the menu software has a function to check an output bin allocated to a self machine, so that it is possible to prevent output paper management from becoming complicated when the printer is used by a plurality of users as well as to prevent contents of print from being leaked to outside. Also it is possible to select required printer functions from the workstation side.

Also in the network system for unified business according to the present invention, the printer has a function a function to check whether paper is on the multi-stage tray as a mail box and in each bin, and a function to output a specified number of sheets of paper for each bin page by page to the mail box; the print server software has a function to confirm that there is no paper in all bins in the mail box, chain bins confirmed as no paper therein and make the bins as targets for sorting and inform each user of the bins, a function to allow sorting, when sorting is requested from the menu software, to the user and make the print job exclusively available to the user, and a function to automatically cancel, when the print job is complete, the sorting function; and the menu software has a function to exclusively use the mail box when sorting is enabled, specify a number of copies and execute printing out, so that sorting is possible and the convenience can be improved.

Also in the network system for unified business according to the present invention, the print server software has a function to set, when a number of bins in the mail box is smaller than a number of sheets of paper to be printed in sorting, a pool tray (a paper discharge tray other than bins in the mail box) and output pages exceeding a number of bins to the pool tray, so that the convenience can largely be improved.

Also in the network system for unified business according to the present invention, the pool tray has an offset function to output paper displacing each sheet alternately to the right and left and also a function to output paper displacing one page from another page when discharging paper exceeding a number of bins in the mail box, so that the convenience can be improved.

Also in the network system for unified business according to the present invention, the print server software has a function to store micro files for print data stream including form overlay or drawings, characters, and image data, a function to load the micro files one by one to the printer, and a function to cancel loading when a micro file already loaded in present in the printer; the menu software for managers has a function to register a new micro file as a micro file in the print server software; and the menu software has a function to read out micro files owned by the print server software as a menu and register a micro file to be used by a self machine in the job style file, so that the macro software can commonly be used by users and the convenience can largely be improved.

Also in a network system for unified business according to the present invention, the print server software has a filter function to convert print data sent from a workstation to that based on the printer language installed in the printer, so that a printer and a filter can completely be separated.

Also in the network system for unified business according to the present invention, the print server software has a function to compute information accumulatively as to what degree printing has been executed under what printing conditions for each printer and the information as to how many sheets of paper have been printed in one print job, and a function to store the accumulated value of printer errors; and the menu software for managers has a function to execute tabular computing for an accumulated number of each printing condition, an accumulated value for each page/print job, and an accumulated value for each printer error, and a function to manage a date for accumulating each value and clear the accumulated values using the function for tabular computing, so that it is possible to know the usage of the printer accurately and in detail and also it is possible to use the data for periodical maintenance service, a service plan, or development of subsequent products.

Also in the network system for unified business according to the present invention, the printer is connected to the print server machine and has a function to convert print data received from the print server software to image data and then print the data on paper and a function to convert print data received from the print server software to image data and then transfer back the data to the print server software without printing the data on paper; the print server software has a function to transfer the image data transferred from the printer to the facsimile server software; and the facsimile server software has a function to make a determination as to whether received data is image data, character data, transfer, when the received data is character data or graphic data, the received data to the print server software, receive corresponding image data from the print server software after the data is converted to image data by the print server software, and transfer the image data to each workstation, so that the function owned by the print server software to convert character/graphic data to image data (lusterizer) can efficiently be utilized and the cost for the entire system can be reduced. Also it is not necessary for each workstation and each I/0 device to incorporate a lusterizer, so that the system configuration can be optimized as a whole.

Also in the network system for unified business according to the present invention, the facsimile server software has a function to detect ID of received data, a function to maintain a table for comparison between IDs and names of users of individual workstations, a function to send the received message, when correspondence between the received ID and a workstation, only to the workstation, and a function to send the received message, when any ID was not detected, to all workstations; and the facsimile menu software has a function to delete, when any received message is received, the received data with ID successfully detected by the facsimile server software, and a function to disable deletion of received data with ID not detected by the facsimile server software, so that each user is liberated from the trouble required to check a target user of each facsimile document and also the security is secured. Also each user can delete or store the facsimile data after reading it, so that unnecessary data never remains in the system.

Also in the network system for unified business according to the present invention comprising a console and a scanner connected to the facsimile server machine, the facsimile server software includes a driver software for the console as well as for the scanner and has a function to enable setting of conditions for transmission through a facsimile machine using the console, a filter function to convert image data read by the scanner to those satisfying a resolution required for facsimile transmission, a function to compress the image data after conversion according to the required resolution, and a function to send the data via a modem through the facsimile machine, so that, even if a workstation for a self machine does not have a scanner, facsimile transmission can be carried out from a scanner for shared use, which enables reduction of a number of scanners and optimization of the system as a whole.

Also in the network system for unified business according to the present invention, the facsimile menu software has a function to set conditions for operations other than facsimile transmission and a function to transfer image data owned by each individual user together with conditions already set up to the facsimile server software; the facsimile server software has a function to compress image data transferred thereto from a workstation after converting the data according to a resolution required for transmission and then transmit the data through a facsimile, so that facsimile transmission can be executed from a scanner of a workstation for a self machine and the convenience can be improved.

Also in the network system according to the present invention, the facsimile menu software has a function to enable setting of conditions for facsimile transmission and a function to transfer image data together with conditions already set up to the facsimile server software; and the facsimile server software has a function to make a determination as to whether a receiving facsimile machine can process character data or graphic data transferred from a workstation as it is according to the facsimile transmission sequence or not, a function to transfer, when the receiving facsimile machine can process the data as it is, the character data or graphic data as it is to the receiving facsimile machine, and a function to transfer the character data or graphic data, when the receiving facsimile machine can not process the data as it is, to the print server software, ask the data to be transferred back to the facsimile server software after the data is converted to image data by the print server software, convert the image data to those based on a required resolution, then compress the data, and execute facsimile transmission of the compressed data, so that it is not necessary to carry out lusterization in a workstation for the self machine and the lusterization is executed by the printer server software, which is useful for optimization of the system as a whole.

Also in the network system for unified business according to the present invention, the facsimile server software has a function to enable setting of conditions for copying using a console, a function to convert image data read by a scanner to those based on a resolution required for the printer or on a printer language installed in the printer, a function to transfer image data to the print server software, a filter function to rotate read image data before sending the image data to the print server software, and a function to automatically rotate an image when the paper feed direction in the printer is different from that of reading by the scanner, so that it is possible to easily realize a copying function.

Also in the network system according to the present invention comprising a scanner and a larger storage capacity memory device each connected to the image server machine, the image server software includes a driver software for the scanner as well as for the large storage capacity memory device and has a function to store image data read from the scanner as image data in the large storage capacity memory device, a function to make an inquiry as to whether each individual workstation can display image data and the resolution of display if possible and maintain the data, and a filter function to convert image data to those based on a resolution required for display or printing in and by each workstation or the printer, so that the system resources including the print server software can commonly be used by all users and the system can be optimized as a whole.

Also in the network system for unified business according to the present invention, a local scanner is connected to each workstation or the facsimile server machine; and the image server software has a function to store image data read from the local scanner as image data in the large storage capacity memory device, so that a manuscript can be inputted not only from a scanner connected to the image server machine, but also from a scanner in each workstation.

Also in the network system for unified business according to the present invention, the image server software has a function to receive and store character data or graphic data to be circulated each transferred and supplied as input from a console, an auxiliary memory device (a floppy disk or a compact disk) or a workstation, a function to make an inquiry as to whether each workstation can display image data or not and types of possible display or print language and store the result of the inquiry, and a filter function to convert image data to those which can be displayed or printed by each workstation or the printer, so that character/graphic data and image data can be treated similarly and the system cost can be minimized.

Also the network system for unified business according to the present invention has a function to transfer a circulation file, when each workstation does not have a language for displaying or printing, from the image server software to the print server software and transfer back image data converted to displayable ones to each workstation, so that it is not necessary to carry out lusterization in a workstation for a self machine and lusterization is executed by the print server software, which enables distribution of system functions and the general optimization of the network system.

Also in the network system for unified business according to the present invention, in which the image server software is a circulation file inputted into the aforesaid auxiliary memory device (a floppy disk and/or a compact disk), the image server software has a function to convert, when the editorial data can not be processed by the print server software or in each workstation, the data to editorial data processable by the print server software or in each workstation and a function to start the filter function by specifying a format of a list file in which types of editorial data processable in each workstation or in a printer as well as a format for input editorial data, so that any externally input file can be converted via the print server software, regardless of the format thereof, which is useful for distribution of system functions and the general system optimization.

Also in the network system for unified business according to the present invention, the image server software has a function to convert data to be transferred to each workstation to character data or graphic data, and a function to transfer the converted character data as well as converted graphic data to each workstation, so that traffics on the LAN decrease and congestion of communications can be evaded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method for operating a network system for combined tasks, to which a plurality of workstations are each connected through a network, said network system being connected to a printer according to an interactive communication so as to treat text data, image data and graphic data, comprising the steps of:

a) receiving, through one of said plurality of workstations, a print job request provided with a user identification;

b) transferring said print job request to a print server;

c) preparing, on the basis of said print job request, a print job style file filed under the user identification together with a plurality of other print job style files in a print server software of the print server;

d) merging a print job from a user with the prepared print job style file provided with the user identification;

e) sending the merged data to said printer; and f) carrying out the print job in the printer under the conditions specified in said prepared print job style file.

2. A method for operating a network system according to claim 1, further comprising:

storing soft fonts for downloading;

downloading the stored soft fonts to the printer; and stopping the loading of a required font when it has been stored in the printer.

3. A method for operating a network system according to claim 1, wherein the printer has a multi-stage output tray as a mail box, further comprising:

specifying, before carrying out the print job, a bin of the multi-stage output tray allocated to each user;

discharging paper to the bin; and outputting mail for a user with no allocated bin to a specified pool tray.

4. A method for operating a network system according to claim 3, further comprising checking whether paper is on the multi-stage tray as a mail box; and outputting a specified number of sheets of paper for each bin page by page to the mail box.

5. A method for operating a network system according to claim 4, further comprising:

setting, when a number of bins in the mail box is smaller than a number of sheets of paper to be printed, a pool tray and outputting pages exceeding the number of bins to the pool tray.

6. A method for operating a network system according to claim 5, further comprising:

outputting paper, by the pool tray, displacing each sheet alternately to the right and to the left and outputting paper displacing one page from another page when discharging paper exceeding the number of bins in the mail box.

7. A method for operating a network system according to claim 1, further comprising:

converting print data sent from a workstation to a printer language installed in the printer.

8. A method for operating a network system according to claim 1, further comprising:

accumulatively computing information as to what degree printing has been executed under what printing conditions for each printer and information as to how many sheets of paper have been printed in one print job; and storing an accumulated value of printer errors.

9. An apparatus for operating a network system for combined tasks, to which a plurality of workstations are each connected through a network, said network system being connected to a printer according to an interactive communication so as to treat text data, image data and graphic data, the apparatus comprising:

a workstation coupled to the network for inputting a print job request provided with a user identification and for transferring said print job request to a print server; and a print server, coupled to the network, for preparing on the basis of said print job request, a print job style file filed under the user identification together with a plurality of other print job style files in a print server software of the print server, for merging a print job from said user with the prepared print job style file provided with the user identification, and for sending the merged data to said printer, wherein the print job is carried out in the printer under the conditions specified in said prepared print job style file.

10. An apparatus for operating a network system according to claim 9, wherein the print server is configured for:

storing soft fonts and for downloading the soft fonts to the printer; and for stopping the loading of a required font when it has been stored in the printer.

11. An apparatus for operating a network system according to claim 9, wherein the printer has a multi-stage output tray as a mail box, wherein the print server software is configured for:

specifying, before carrying out the print job, a bin of the multi-stage output tray allocated to each user;

discharging paper to the bin; and outputting mail for a user with no allocated bin to a specified pool tray.

12. An apparatus for operating a network system according to claim 11, wherein the printer is configured for:

checking whether paper is on the multi-stage tray as a mail box; and outputting a specified number of sheets of paper for each bin to the mail box.

13. An apparatus for operating a network system according to claim 12, wherein the print server software is configured for:

setting, when a number of bins in the mail box is smaller than a number of sheets of paper to be printed, a pool tray and outputting pages exceeding the number of bins to the pool tray.

14. An apparatus for operating a network system according to claim 13, wherein the pool tray is configured for:

outputting paper and for displacing each sheet alternately to the right and to the left and outputting paper displacing one page from another page when discharging paper exceeding the number of bins in the mail box.

15. An apparatus for operating a network system according to claim 9, wherein the print server software is configured for:

converting print data sent from a workstation to a printer language installed in the printer.

16. An apparatus for operating a network system according to claim 9, wherein the print server software is configured for:

accumulatively computing information as to what degree printing has been executed under what printing conditions for each printer and information as to how many sheets of paper have been printed in one print job; and storing an accumulated value of printer errors.

17. An apparatus for operating a network system for combined tasks, to which a plurality of workstations are each connected through a network, said network system being connected to a printer according to an interactive communication so as to treat text data, image data and graphic data, the apparatus comprising:

inputting means for inputting, through one of said plurality of workstations, a print job request provided with a user identification;

transferring means for transferring said print job request;

preparing means for preparing, on the basis of said print job request, a print job style file filed under the user identification together with a plurality of other print job style files in a print server software of a print server;

merging means for merging a print job from said user with the prepared print job style file provided with the user identification;

sending means for sending the merged data to said printer; and means for carrying out the print job in the printer under the conditions specified in said prepared print job style file.

18. An apparatus for operating a network system according to claim 17, comprising:

storing means for storing soft fonts;

means for downloading the stored soft fonts to the printer; and means for stopping the loading of a required font when it has been stored in the printer.

19. An apparatus for operating a network system according to claim 17, wherein the printer has a multi-stage output tray as a mail box, comprising:

means for specifying, before carrying out the print job, a bin of the multi-stage output tray allocated to each user;

means for discharging paper to the bin; and means for outputting mail for a user with no allocated bin to a specified pool tray.

20. An apparatus for operating a network system according to claim 19, comprising:

means for checking whether paper is on the multi-stage tray as a mail box; and means for outputting a specified number of sheets of paper for each bin to the mail box.

21. An apparatus for operating a network system according to claim 20, comprising:

means for setting, when a number of bins in the mail box is smaller than a number of sheets of paper to be printed, a pool tray and outputting pages exceeding the number of bins to the pool tray.

22. An apparatus for operating a network system according to claim 21, comprising:

means for outputting paper, displacing each sheet alternately to the right and to the left and outputting paper displacing one page from another page when discharging paper exceeding the number of bins in the mail box.

23. An apparatus for operating a network system according to claim 17, further comprising:

means for converting print data sent from a workstation to a printer language installed in the printer.

24. An apparatus for operating a network system according to claim 17, comprising:

means for accumulatively computing information as to what degree printing has been executed under what printing conditions for each printer and information as to how many sheets of paper have been printed in one print job; and means for storing an accumulated value of printer errors.

25. A computer readable medium having stored thereon a plurality of sequences of instructions for operating a network system for combined tasks, to which a plurality of workstations are each connected through a network, said network system being connected to a printer according to an interactive communication so as to treat text data, image data and graphic data, the plurality of sequences of instructions including sequences of instructions which, when executed by a processor, cause said processor to perform the steps of:

a) transferring a print job request, inputted through one of said plurality of workstations, to a print server, wherein said print job request is provided with a user identification;

b) preparing, on the basis of said print job request, a print job style file filed under the user identification together with a plurality of other print job style files in a print server software of the print server;

c) merging a print job from a user with the prepared print job style file provided with the user identification;

d) sending the merged data to said printer; and e) carrying out the print job in the printer under the conditions specified in said prepared print job style file.

26. The computer readable medium of claim 25, causing said processor to perform the steps of:

storing soft fonts;

loading the stored soft fonts to the printer; and stopping the loading of a required font when it has been stored in the printer.

27. The computer readable medium of claim 25, causing said processor to perform the steps of:

specifying, before carrying out the print job, a bin of a multi-stage output tray of the printer allocated to each user;

discharging paper to the bin; and outputting mail for a user with no allocated bin to a specified pool tray.

28. The computer readable medium of claim 27, causing said processor to perform the steps of:

checking whether paper is on the multi-stage tray as a mail box; and outputting a specified number of sheets of paper for each bin to the mail box.

29. The computer readable medium of claim 28, causing said processor to perform the steps of:

setting, when a number of bins in the mail box is smaller than a number of sheets of paper to be printed, a pool tray and output pages exceeding the number of bins to the pool tray.

30. The computer readable medium of claim 29, causing said processor to perform the steps of:

outputting paper, by the pool tray, displacing each sheet alternately to the right and to the left and outputting paper displacing one page from another page when discharging paper exceeding the number of bins in the mail box.

31. The computer readable medium of claim 25, causing said processor to perform the steps of:

converting print data sent from a workstation to a printer language installed in the printer.

32. The computer readable medium of claim 25, causing said processor to perform the steps of:

accumulatively computing information as to what degree printing has been executed under what printing conditions for each printer and information as to how many sheets of paper have been printed in one print job; and storing an accumulated value of printer errors.

* * * * *